(12) United States Patent
Spijker et al.

(10) Patent No.: US 11,096,517 B2
(45) Date of Patent: Aug. 24, 2021

(54) SELECTION VALVE AND BEVERAGE SYSTEM INCLUDING SAME

(71) Applicant: Koninklijke Douwe Egberts B.V., Utrecht (NL)

(72) Inventors: Antonius Johannes Spijker, Utrecht (NL); Bram Klabbers, Utrecht (NL); Hendrik Johan Dees, Utrecht (NL); Koen Standaar, Utrecht (NL); Leonardus Cornelis van der Velden, Utrecht (NL); Mathias Antonius Fransiscus Rutten, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 457 days.

(21) Appl. No.: 16/006,471

(22) Filed: Jun. 12, 2018

(65) Prior Publication Data
US 2019/0045970 A1    Feb. 14, 2019

Related U.S. Application Data

(63) Continuation of application No. PCT/NL2016/050872, filed on Dec. 14, 2016.

(30) Foreign Application Priority Data

Dec. 15, 2015  (EP) .................................... 15200243

(51) Int. Cl.
*A47J 31/36*  (2006.01)
*A47J 31/40*  (2006.01)
(Continued)

(52) U.S. Cl.
CPC ......... *A47J 31/3695* (2013.01); *A47J 31/407* (2013.01); *A47J 31/41* (2013.01);
(Continued)

(58) Field of Classification Search
CPC .... A47J 31/3695; A47J 31/461; A47J 31/469; A47J 31/407; A47J 31/41; A47J 31/46;
(Continued)

(56) References Cited

U.S. PATENT DOCUMENTS

| 4,674,400 A | 6/1987 | Rondel |
| 6,682,047 B1 * | 1/2004 | Piscaer ................. A47J 31/461 251/326 |

(Continued)

FOREIGN PATENT DOCUMENTS

| RU | 2357640 | 1/2008 |
| RU | 2448635 | 8/2011 |

(Continued)

OTHER PUBLICATIONS

Russion Applicaiton No. 2018125947; Decision to Grant and Report on Results of Examination dated May 26, 2020 (4 pgs.).

(Continued)

*Primary Examiner* — Dana Ross
*Assistant Examiner* — Joe E Mills, Jr.
(74) *Attorney, Agent, or Firm* — Fitch, Even, Tabin & Flannery LLP

(57) ABSTRACT

A selection valve for a beverage preparation machine comprises a valve body with a hot water inlet, an air inlet, and at least a first outlet. A selector member is movably mounted relative to the valve body for movement between a first position in which the hot water inlet is in fluid communication with the at least first outlet, and a second position in which both the hot water inlet and the air inlet are in fluid communication with the at least first outlet. A satellite element has a predefined limited amount of free relative movement relative to the selector member for allowing the satellite element to be independently positioned between the first and second positions of the selector member.

20 Claims, 17 Drawing Sheets

(51) Int. Cl.
  *A47J 31/41* (2006.01)
  *A47J 31/46* (2006.01)
  *F16K 11/16* (2006.01)
  *F16K 31/04* (2006.01)
(52) U.S. Cl.
  CPC ........... *A47J 31/461* (2018.08); *A47J 31/469* (2018.08); *F16K 11/161* (2013.01); *F16K 31/043* (2013.01)
(58) Field of Classification Search
  CPC ........ A47J 31/24; A47J 31/44; A47J 31/4496; A47J 31/4485; A47J 31/4489; F16K 11/161; F16K 11/40; F16K 31/043; F16K 31/041
  USPC ........................................ 99/300, 293, 323.1
  See application file for complete search history.

(56) References Cited

U.S. PATENT DOCUMENTS

| | | | |
|---|---|---|---|
| 7,644,649 B2 | 1/2010 | Dworzak | |
| 8,408,117 B2 | 4/2013 | De Longhi | |
| 9,173,518 B2 | 11/2015 | Vidondo | |
| 2009/0272274 A1* | 11/2009 | De Graaff | B67D 1/0046 99/279 |
| 2015/0173563 A1* | 6/2015 | Priley | A47J 31/407 426/425 |
| 2018/0206670 A1* | 7/2018 | Ait Bouziad | A47J 31/4485 |

FOREIGN PATENT DOCUMENTS

| | | |
|---|---|---|
| WO | 2007120047 | 10/2007 |
| WO | WO 2007/120047 | 10/2007 |
| WO | 2009101188 | 8/2009 |
| WO | 2015102488 | 7/2015 |
| WO | WO 2015/102488 | 7/2015 |
| WO | WO 2016/096913 | 6/2016 |

OTHER PUBLICATIONS

International Search Report and Written Opinion, PCT/NL2016/050872, Koninklijke Douwe Egberts B.V., 8 pages (dated Feb. 22, 2017).

* cited by examiner

SELECTION VALVE AND BEVERAGE SYSTEM INCLUDING SAME

CROSS-REFERENCE TO RELATED APPLICATIONS

This application is a continuation of International Application No. PCT/NL2016/050872, filed Dec. 14, 2016, which claims the benefit of and priority to European Patent Application No. 15200243.2, filed Dec. 15, 2015, the entire contents of all of which are hereby incorporated herein by reference.

BACKGROUND

The invention relates to a selection valve and a system including same, in particular a selection valve that can be part of a beverage ingredient mixing unit, or a beverage preparation machine that form part of a beverage preparation system for hot beverages.

Such beverage systems are described in published international patent application document WO 2015/102488. Several individual valves are used in such beverage systems for controlling the distribution of hot water for mixing with one or more beverage ingredients, and of steam or air over various flow paths of the system. Such a multiplicity of valve components complicates the layout of such beverage systems, and complicates their manufacture and maintenance.

Accordingly, it is an object of the present invention to propose an improved selection valve for use in the preparation of hot beverages. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative. As such the present invention counts amongst its objects: prevention of backflow, improvement of foam quality (crema), creation of a black coffee (no crema), integration of a boiler by-pass valve in the ceramic selector valve, elimination of a separate air valve block, reduce waterjet pressure, reduction of friction between moving valve elements, miniaturization of valve components, reducing spring bias force, enabling a smaller valve drive motor, enabling a smaller and more silent water pump, creating a precise positioning and feedback of the ceramic valve elements, with a possibly absolute positioning signal, and simplify swirl chamber design.

SUMMARY

To this end the invention provides a selection valve as defined by the appended claims. As further defined by the appended claims the invention also provides a beverage ingredient mixing unit comprising the selection valve, a beverage preparation machine including the selection valve or the beverage ingredient mixing unit, and a beverage preparation system including the beverage preparation machine, in combination with an exchangeable beverage ingredient supply cartridge.

With the optionally ceramic valve elements in the 'Crema' position, air is pumped through, water is pumped through a 0.95 mm hole, and the swirl chamber is open.

With the optionally ceramic valve elements in the 'Closed' position, the air inlet is closed, the water inlet is closed, and the swirl chamber is closed. The 'Closed' position can be used in cleaning to fill the swirl chamber.

With the optionally ceramic valve elements in the 'Vented' position, the air inlet is closed, the water inlet is closed, and the swirl chamber is vented. The 'Vented' position can be used to empty dispensing tubes at each end of a dispensing cycle.

With the optionally ceramic valve elements in the 'By-pass' position, the air inlet is closed, the water inlet is in fluid communication with the water supply tank, and the swirl chamber is closed. The 'By-pass' position can be used as a default position.

With the optionally ceramic valve elements in the 'Black Coffee' position, the air inlet is closed, the water is pumped through a larger 5 mm hole, and the swirl chamber is closed. The 'Black Coffee' position can be used to obtain foamless drinks.

Mechanical delay of the satellite element is obtained by creating lost motion with a 10° free rotational play between the holder and the satellite element, which is advantageous in crushing limestone buildup. To ensure that the satellite element remains in crema position, a spring biased locking detent or pin is used to retain the satellite element. The locking pin is pushed downwards by a cam on the holder and enables the satellite element to move only after the holder has rotated 10° in a counter clockwise direction as viewed in the direction of the valve outlet. Then the satellite element will be enabled to rotate forced by and together with the holder and the other movable valve elements.

Reduced friction between the ceramic elements has been obtained by minimizing their confronting contact areas, by appropriately adapting the surface roughness of the elements, by reducing water pressure, and by reducing spring bias force exerted on the ceramic elements. While this friction reduction has lowered the power requirement for the valve drive motor, it is with a given drive motor power also possible to increase power surplus margins to cope with possible age and/or use related future increases in power consumption. As regards surface roughness induced motor torque, it has been found as a best choice that, when surface roughness of the ceramic elements has a value of 6 µm, all ceramic elements are air and water tight against 4.2 bar at 70° C., and against 4.5 bar at 20° C. The actually preferred water pressures at 1.3 to 1.7 bar are much lower, and allow a reduced bias pressure on the ceramic valve elements. As a consequence less power is consumed in operating the selection valve. A further reduction of friction has been obtained by reducing the contact area between the ceramic valve element. The latter has been accomplished by providing raised contact areas, or recessed areas, in at least one of the confronting surfaces of adjacent valve elements.

BRIEF DESCRIPTION OF THE DRAWINGS

Further advantageous aspects of the invention will become clear from the appended description and in reference to the accompanying drawings, in which.

DETAILED DESCRIPTION

Figure 1:
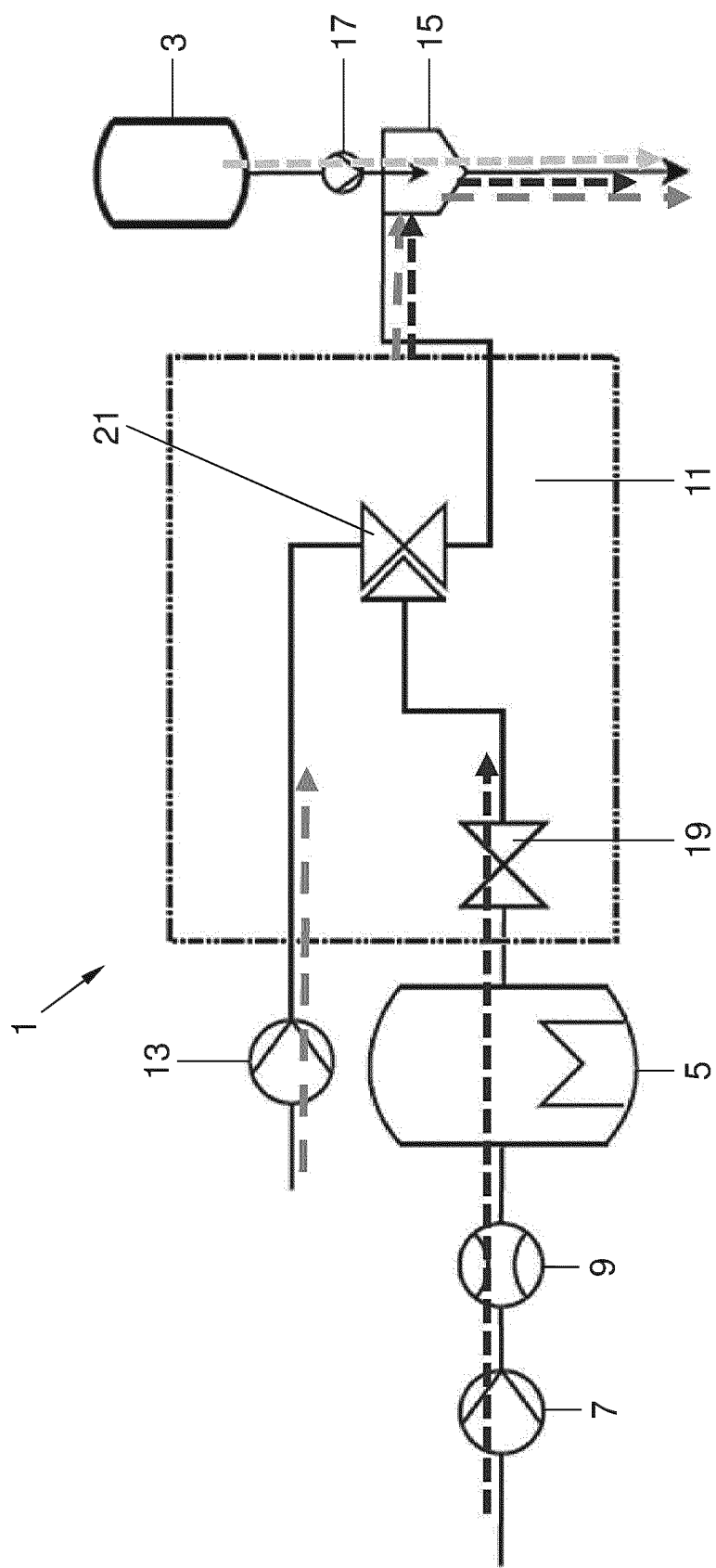
FIG. 1 is a schematic diagram showing a layout of a beverage preparation system according to the invention.

A beverage preparation system 1 is illustrated in FIG. 1. The beverage preparation system 1 includes a beverage preparation machine in combination with an exchangeable beverage ingredient supply cartridge 3. The ingredient supply cartridge 3 is of an exchangeable type and can be generally of a type as described in WO 2015/102488. The beverage preparation machine of the system 1 includes a water heater or boiler 5, which is supplied with water by means of a water supply pump 7. The water supply pump 7 can be any suitable fluid pump, and is preferably of a type that can generate water pressures between 1.3 and 1.7 bar. Optionally a flow meter 9 can be interposed between the water supply pump 7 and the boiler 5. Hot water prepared in the boiler 5 can be supplied to a selection valve 11. An air pump 13 is provided in the beverage machine for supplying pressurized air to the selection valve 11. The selection valve 11 controls a supply of hot water and/or pressurized air to a mixing chamber 15, in which a swirl is created by a jet of hot water, or a jet of hot water and air, to mix with a beverage ingredient that is fed to the mixing chamber 15 from the ingredient cartridge 3. An appropriate amount of beverage ingredient is metered by a dosing pump 17, which is interposed between the beverage ingredient cartridge 3 and the mixing chamber 15. The dosing pump 17 can be an integral part of the ingredient supply cartridge 3. The selection valve 11 incorporates a water supply valve, schematically represented by reference numeral 19, as well as a selector member, schematically represented by reference numeral 21. The selector member 21 can be configured to allow air admission from the air pump 13.

Figure 2:
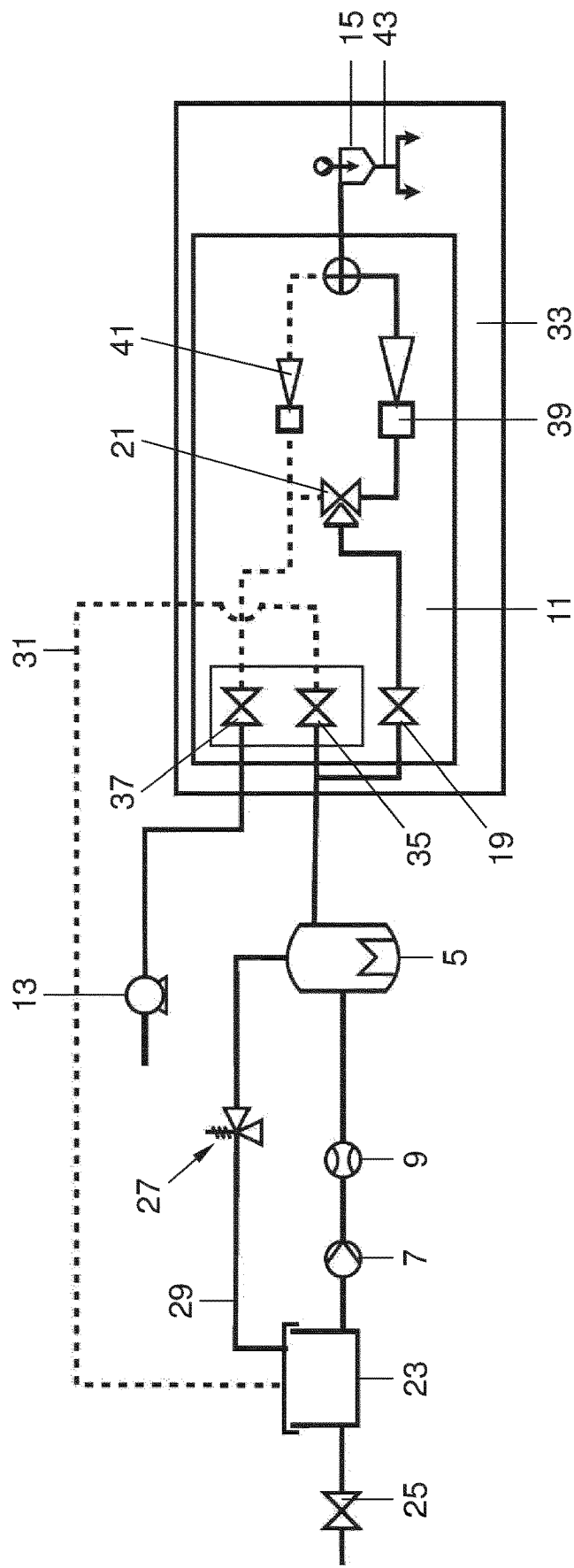
FIG. 2 is a schematic layout diagram of a beverage preparation machine according to the invention.

As further illustrated in FIG. 2, the beverage preparation machine may also comprise a water supply tank or water buffer reservoir 23, which may be in fluid communication with a tap water outlet 25. Safety regulations may require that the boiler 5 is additionally provided with a pressure relief valve 27, which as schematically represented in FIG. 2, can open an overpressure return conduit 29 connecting to the water tank 23. As also schematically illustrated in FIG. 2, the selection valve 11 can open a by-pass conduit 31 also connecting to the water tank 23. The selection valve 11 and the mixing chamber 15 are conveniently combined to provide a beverage ingredient mixing unit 33. In a schematic fashion FIG. 2 also illustrates that the selection valve 11, in conjunction with the water supply valve 19 and the selector member 21, also includes a by-pass valve 35 and an air valve 37 schematically representing the function of controlled air admission from the air pump 13. Further it is schematically illustrated by FIG. 2 that the selector member 21 allows selection between a first position in which the hot water boiler 5 is in fluid communication with the mixing chamber 15 via a relatively large nozzle 39 and a second position in which both the water boiler 5 and the air pump 13 are in communication with the mixing chamber 15 via a relatively small nozzle 41. The mixing chamber 15 discharges a beverage such as a coffee ready for consumption, from its beverage outlet 43.

Figure 3A:
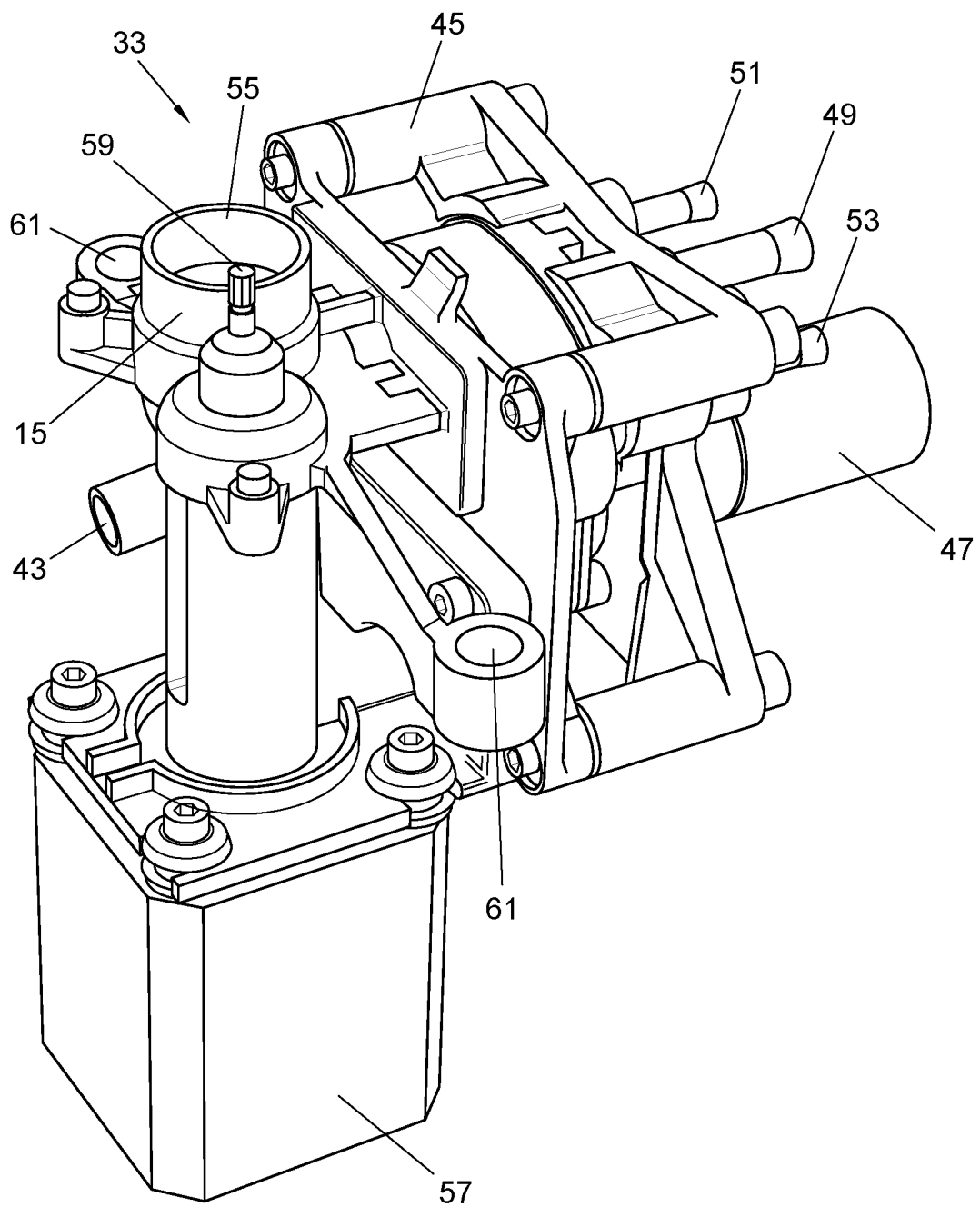
FIGS. 3A and 3B are isometric views from different angles of a beverage ingredient mixing unit according to the invention.
Figure 3B:
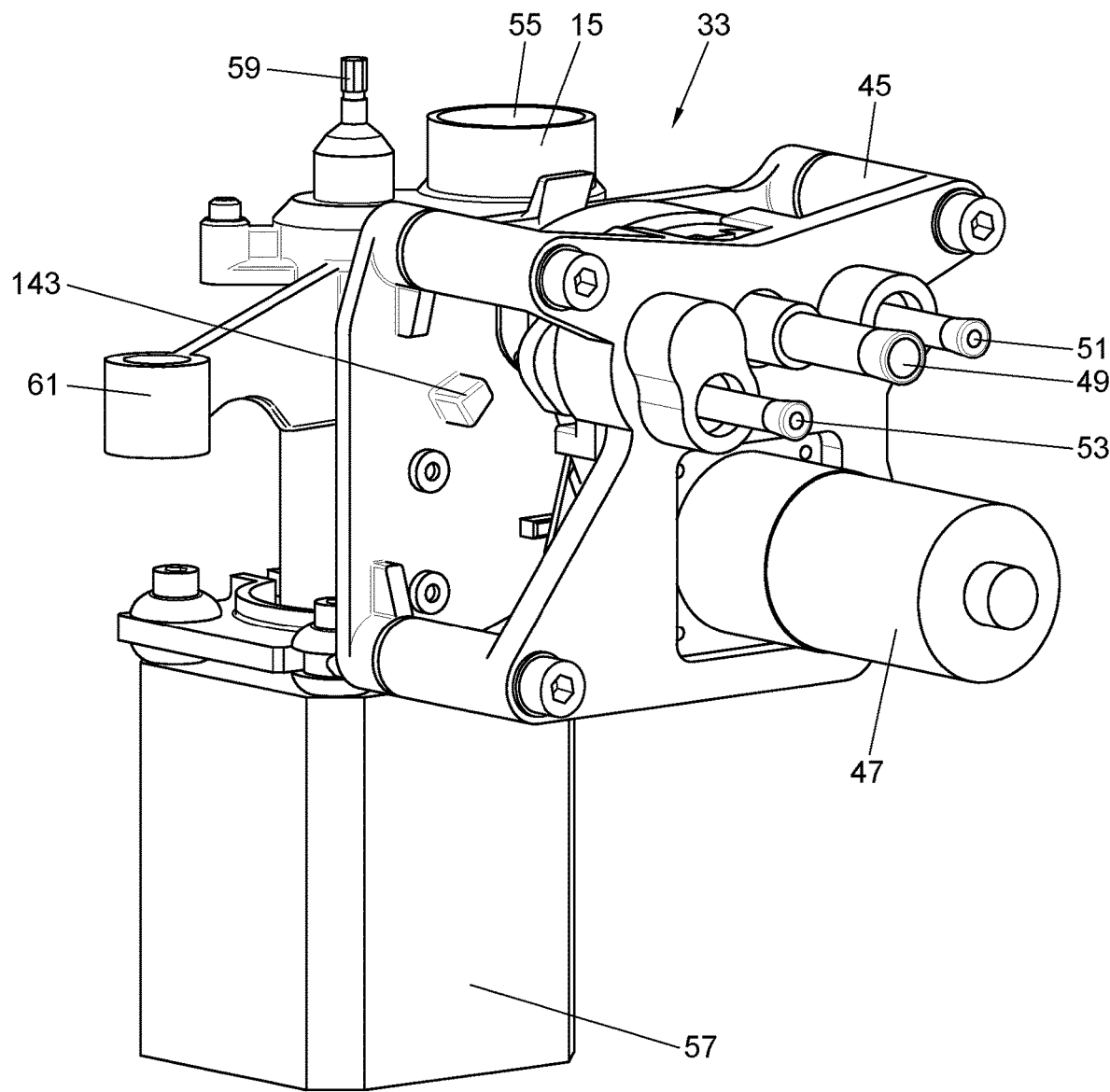

Referring now to FIGS. 3A and 3B, the beverage ingredient mixing unit 33 will be described in relation to one particular non-limiting form of execution. The beverage ingredient mixing unit 33 has a valve body 45 and an electric valve positioning drive motor 47. The valve body 45 is further provided with a water inlet 49 for receiving hot water from boiler 5 (not shown in FIGS. 3A and 3B, but explained in reference to FIGS. 1 and 2). Parallel to the water inlet 49 the valve body 45 also has an air inlet 51 for receiving air from air pump 13 (shown in FIGS. 1 and 2), and a water by-pass outlet 53 for connection to the by-pass conduit 31 (shown in FIG. 2). The air pump 13 can conveniently be a diaphragm pump, arranged to deliver an overpressure of 0.2 to 0.3 bar. On an opposite side to the water and air inlets 49, 51 the valve body 45 also carries the mixing chamber 15 with beverage outlet 43. The mixing chamber 15 further includes a beverage ingredient inlet 55. The beverage ingredient inlet 55 is adapted to connect to an ingredient port of the beverage ingredient cartridge 3 (FIG. 1) in a manner as described in WO 2015/102488. Also for the purpose of cooperating with the ingredient cartridge 3 of the beverage system 1 the beverage ingredient mixing unit as shown in FIGS. 3A and 3B additionally is provided with an electric stepper motor 57, which drives a protruding drive shaft 59. The drive shaft 59 is adapted to be coupled to a drive port of the ingredient cartridge 3 (FIG. 1) in a manner as described in WO 2015/102488. The beverage ingredient mixing unit also includes mounting holes 61 for receiving fasteners to allow it to be mounted to the beverage preparation machine.

Figure 4:
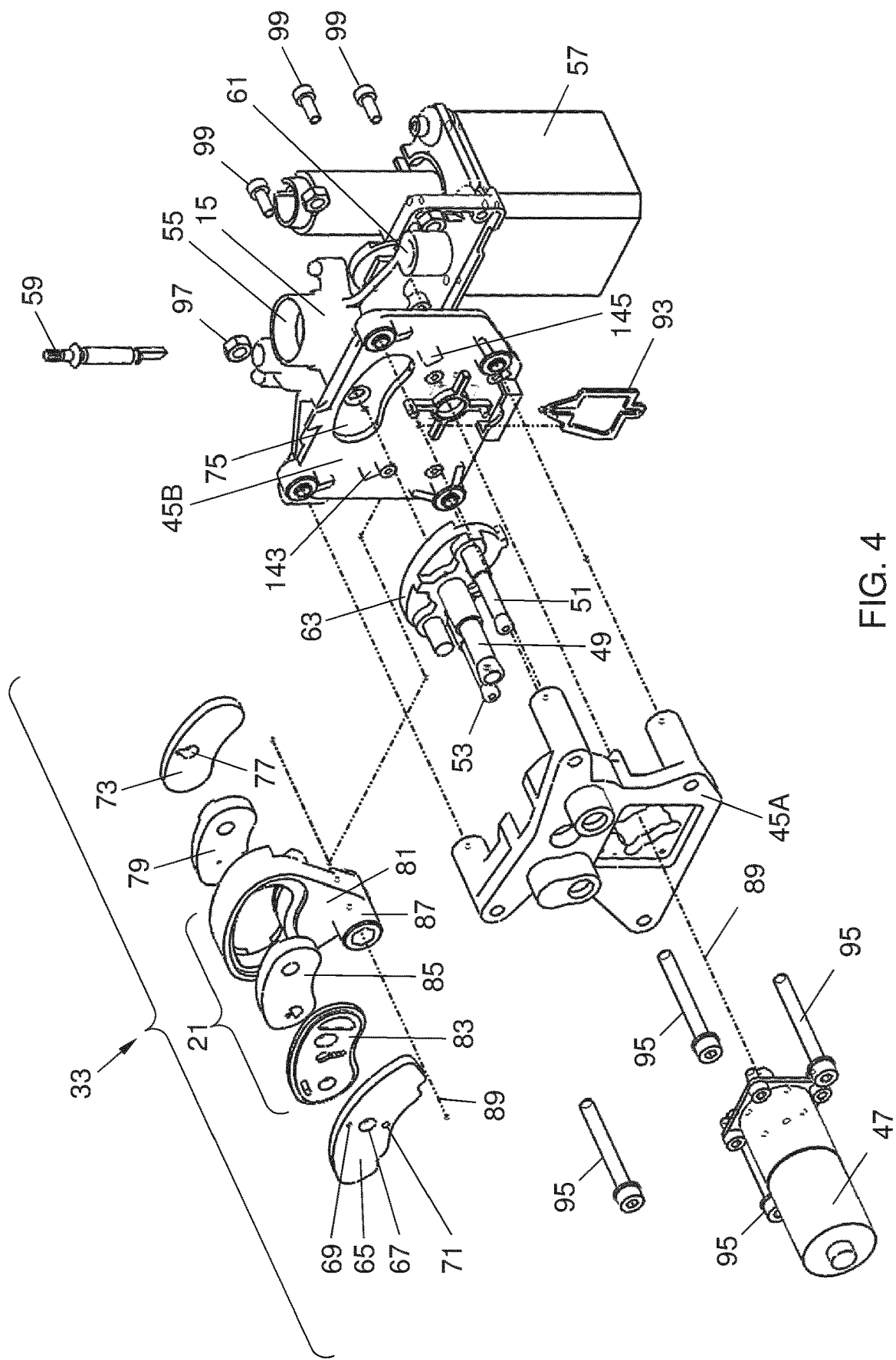
FIG. 4 is an exploded view of the beverage ingredient mixing unit of FIGS. 3A and 3B, as viewed from its water inlet side.
Figure 5:
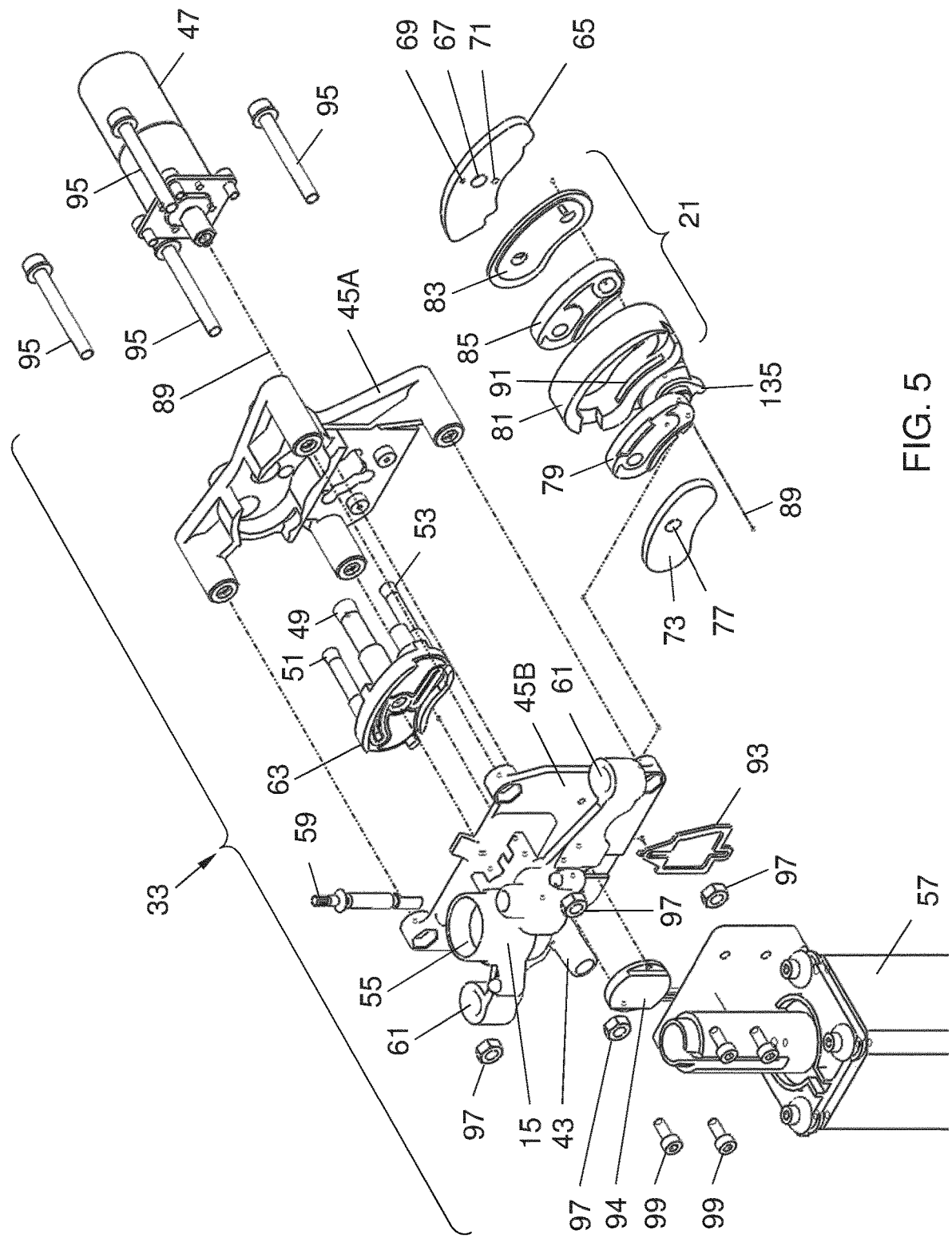
FIG. 5 is an exploded view of the beverage ingredient mixing unit of FIGS. 3A and 3B, as viewed from its beverage ingredient inlet side.

FIGS. 4 and 5 are exploded views of the beverage ingredient mixing unit 33 of FIGS. 3A and 3B from opposite directions. The reference numerals used to describe FIGS. 3A and 3B are repeated in FIGS. 4 and 5, but the description will now focus on the internal components of the selection valve that are accommodated in the valve body 45. The water inlet 49, air inlet 51, and water by-pass outlet 53 are part of a manifold 63 that is received in a first valve body part 45A and partially protrudes therefrom to the exterior when mounted, as best seen in FIG. 3B. The manifold 63 is adapted to receive a first stationary outer valve element 65. This first outer valve element 65 is held in a stationary position and is made of a material that is both heat and wear resistant. In the present example the heat and wear resistant material is a ceramic material, but in another embodiment could also be replaced by metal. The outer valve element 65 includes a main aperture 67 for allowing passage of hot water from the water inlet 49. The first outer valve element 65 also has somewhat smaller upper and lower apertures 69, 71. The upper aperture 69 through the manifold 63 is connected to the air inlet 51, and the lower aperture 71 is connected to the by-pass outlet 53. A second stationary outer valve element 73 is non-movably received in a cavity 75 of a second valve body part 45B. This second outer valve element 73 has a central aperture 77 for the fluid communication with the mixing chamber 15. Again the second outer valve element 73 is of a heat and wear resistant material, such as preferbly a ceramic material, but optionally also excecutable in a metal material. Inbetween the first and second outer valve elements 65, 73 are positioned a movable selector member 21, and a satellite element 79. The movable selector member 21 is composed of a holder 81 containing a first selector member element 83 and a second selector member element 85. The first and second selector elements 83, 85 are non-movably held with respect to one another by the holder 81. The holder 81 takes the form of a povitable sector, which is povitably supported by the first and second valve body parts 45A, 45B by means of a hub 87. The holder 81 thereby can be pivoted about a centre of rotation 89, which coincides with the centre of rotation of the electric valve drive motor 47. The valve drive motor 47 can conveniently be a gear motor or a stepper motor. The hub 87 is connected to the drive motor 47 to be rotated thereby. A stop bracket 93 with a central window thereof also is arranged about this centre of rotation 89. A Hall-type sensor 94 is arranged on the exterior of the second valve body part 45B to provide information about the rotative postions of the holder 81 of selector member 21. This information is transmitted from Hall sensor 94 to a central control unit, which is not shown but of a conventional type.

Figure 6:
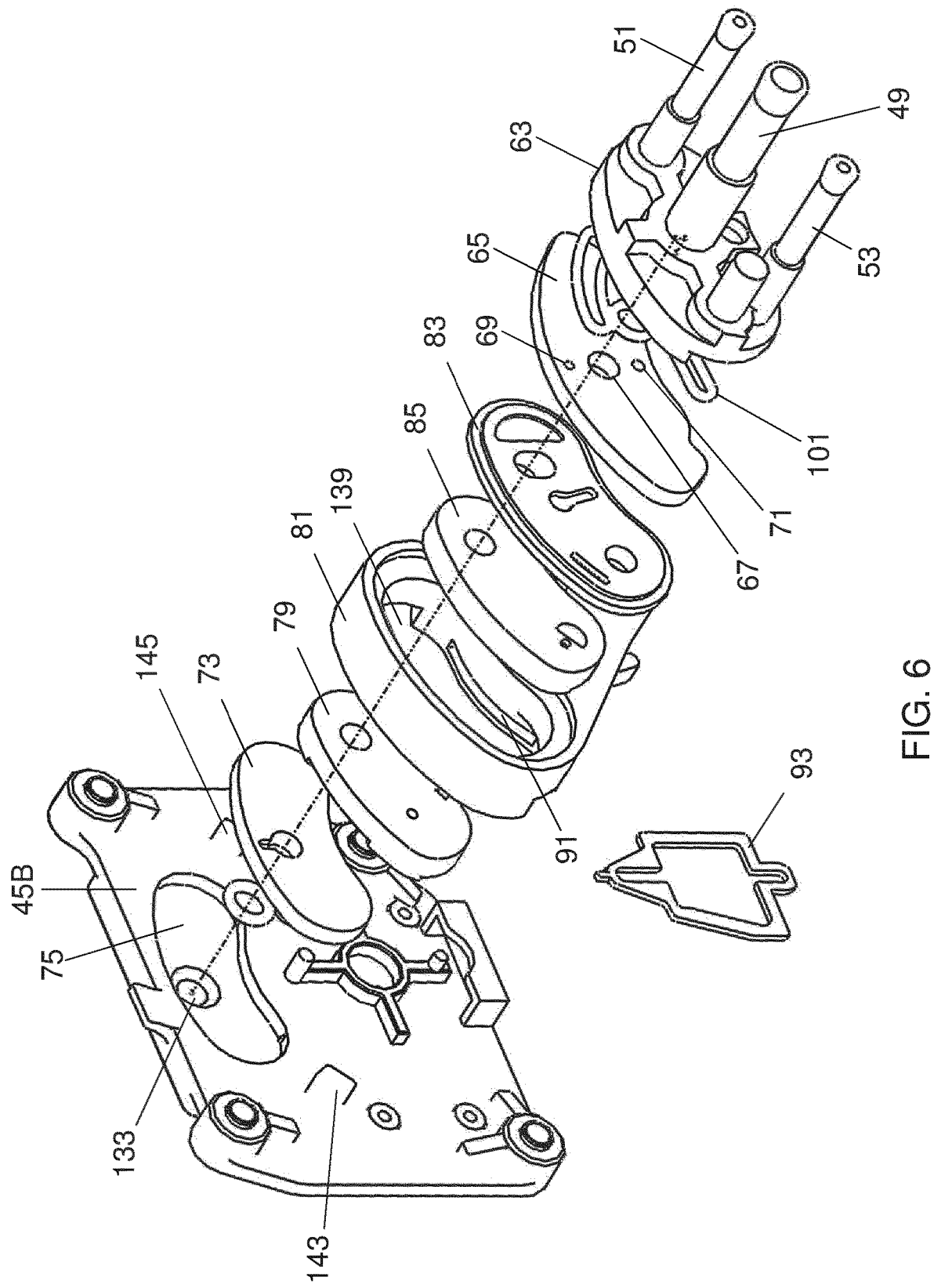
FIG. 6 is an exploded view showing only the selection valve components of FIGS. 4 and 5 on an enlarged scale.

In further reference to FIG. 6, showing the typical selection valve components in greater detail, it will be seen that the holder 81 has an elongate slot 91 that allows passage of an upper portion of the stop bracket 93, as will be described in detail below.

Also directly evident from drawing FIGS. 4 and 5 is that the first and second valve body parts 45A and 45B can be held together by standard fasteners, such as the illustrated bolts 95 and nuts 97. In a similar fashion the stepper motor 57 with is protruding drive shaft 59 can be attached as a subassembly to the second body part 45B by means of screws 99.

Figure 7A:
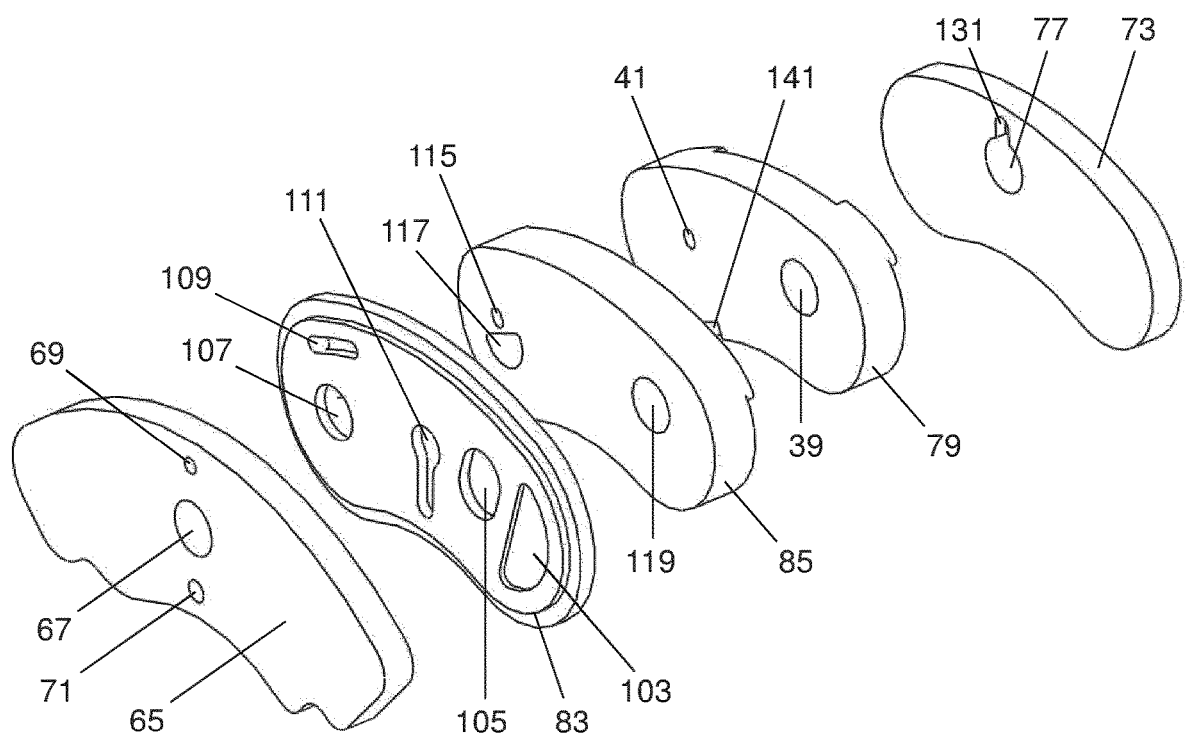
FIGS. 7A and 7B show a set of valve elements in an exploded arrangement as viewed from upstream and downstream ends.
Figure 7B:
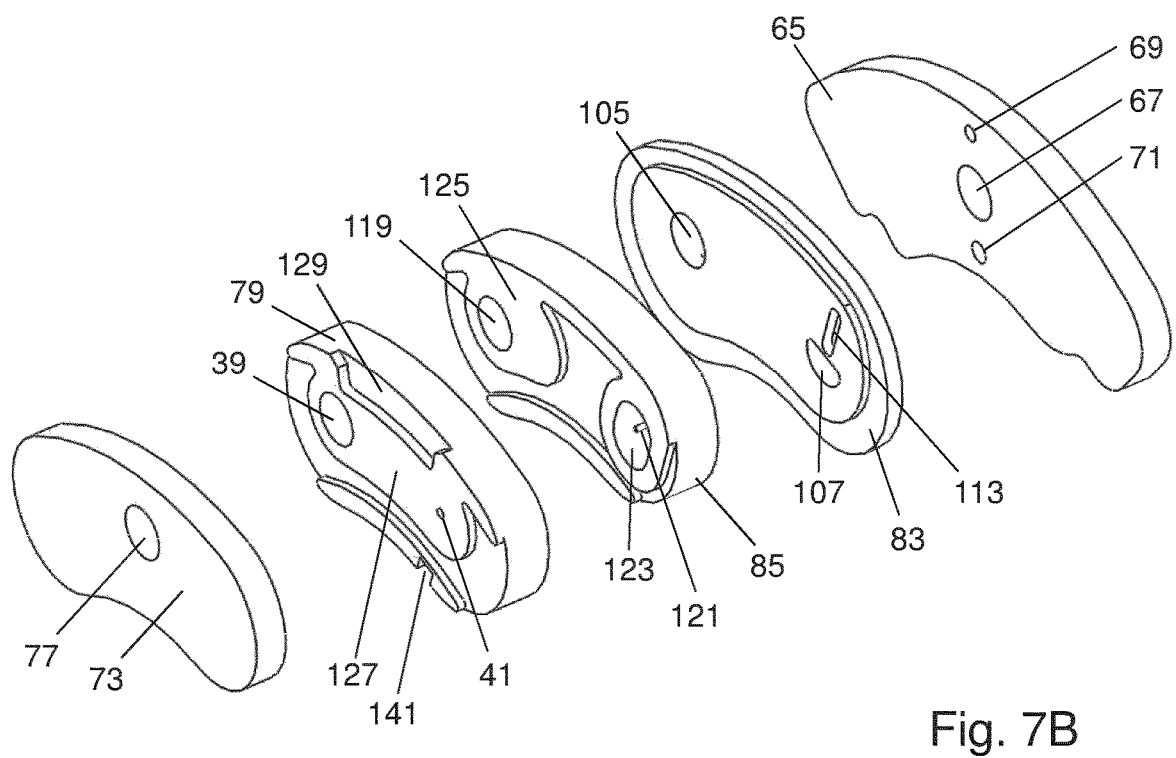

FIGS. 7A and 7B show the set of valve elements 71, 73, 79, 83, 85 isolated from the valve body components and the other selector member components of the FIG. 6 arrangement. The first outer valve element 65 has its main aperture 67 functioning as a hot water passage for receiving hot water from water inlet 49 (shown in FIGS. 4-6). The upper aperture 69 functions as an air inlet passage by receiving air from air inlet 51 through the manifold 63 (see FIGS. 4-6). A seal element 101 as illustrated in FIG. 6 ensures that air from air inlet 51 is guided by the manifold 63 to the upper aperture 69 of the first outer valve element 65. In a similar way the lower aperture 71 functions in supplying by-pass outlet 53 with hot water as further ensured by the manifold 63 and seal element 101.

It is further seen in FIGS. 7A and 7B that the first selector element 83 on its contact surface facing the first outer element 65 has a recess 103 for reducing the contact area between the first selector element 83 and the first outer element 65. Further also facing the first outer element 65 are a first water opening 105 and a reduced second opening 107 passing through the first selector element 83. On the same side of the first selector element 83 (FIG. 7A) are also arranged an air channel opening 109 and a recessed by-pass channel 111. The air channel opening 109 communicates with an air channel 113 on an opposite side of the first selector element 83 (FIG. 7B).

The downstream side of the first selector element 83 visible in FIG. 7B confronts an upstream side of the second selector element 85 visible in FIG. 7A. The side of the second selector element 85 visible in FIG. 7A has an air needle inlet 115 communicating with air channel 113 of the first selector element 83. A smaller first water opening 117 of the second selector element 85 communicates with the first water opening 105 of the first selector element 83, while a large second water opening formed as a bore 119 of the second selector element 85 communicates with the second water opening 107 of the first selector element 83.

As will be clear from the description hereinabove, the first and second selector elements 83, 85 operate as a common element together with the holder 81 (FIGS. 4-6). The execution as three individual components in this example is a result of material requirements and economy of manufacture. Nonetheless it would be possible to combine the first and second selector element 83, 85 into a single component, and even together with the holder 81 as a single component, when 3D-printing allows a suitable material to be printed. However in the present arrangement using ceramic material for the selector elements 83, 85 and plastic or metal for the holder element 81 it is indeed convenient to use an arrangement with three individual components as described for the current example.

A downstream side of the second selector member 85 visible in FIG. 7B confronts an upstream side of the satellite element 79 visible in FIG. 7A. The downstream side of the second selector element 85 that confronts the satellite element 79 is provided with an air needle 121 that extends centrally within a first water opening 123. The first water opening 123, that communicates with the smaller first water opening 117 on the upstream side of the second selector element 85 (see FIG. 7A). The larger second bore 119 of the second selector element 85 extends uninterrupted to the opposite side. Both the first water opening 117 and the bore 119 of the second selector element 85 are opening into a downstream elevated contact area 125, which confronts an upstream side of the satellite element 79.

The upstream side of the satellite element 79 as visible in FIG. 7A has a substantially flat surface from which the large nozzle 39 and the small nozzle 41 (see also schematic FIG. 2) extend through to the downstream side visible in FIG. 7B. The downstream side of the satellite element 79 also has an elevated surface area 127 to reduce the contact surface area, and further has a vent recess 129 for a purpose that will be described herein below. The upstream side of the second outer element 73, as seen in FIG. 7A is again substantially flat, but the central aperture 77 is enlarged with a vent channel 131. The downstream side of the second outer element 73 is also flat and abuts the bottom of the cavity 75 of the second valve body part 45B (see FIG. 6).

As is further shown in FIG. 6, the cavity 75 which retains the second outer element 73 in a stationary position, also aligns the central aperture 77 with an entrance opening 133 of the mixing chamber 15 (see also FIG. 4).

Figure 8A:
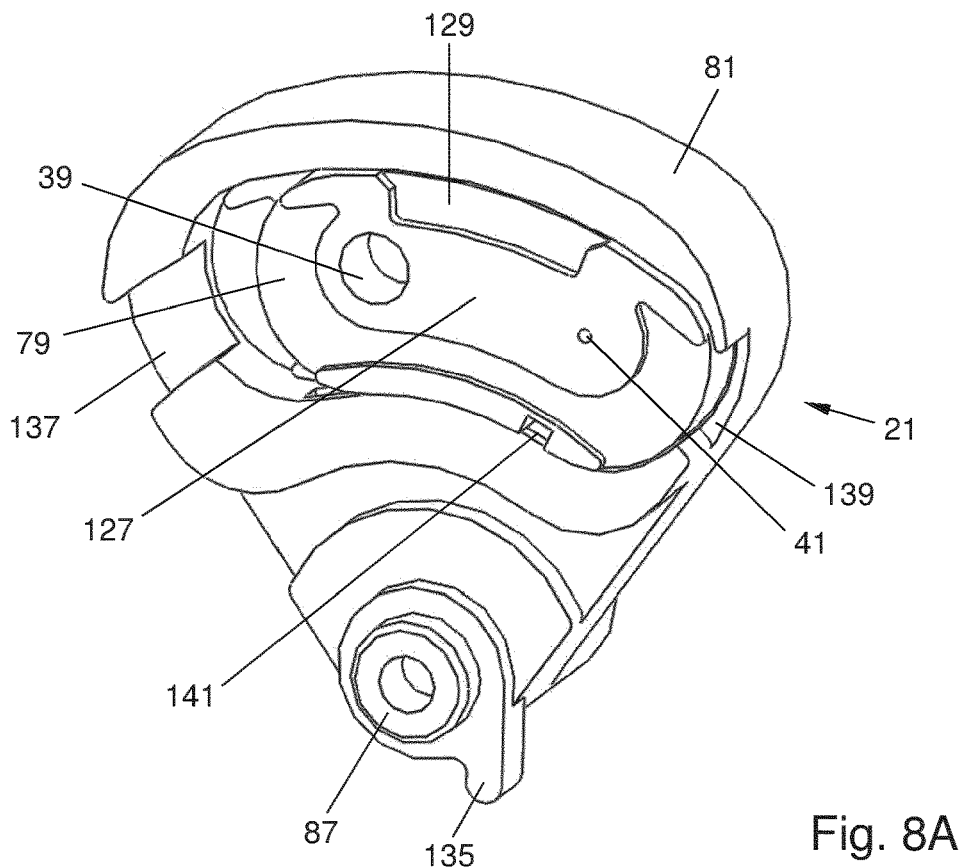
FIGS. 8A and 8B show a selector member of the selection valve with a holder and a satellite element thereof in each of their opposite relative end positions.
Figure 8B:
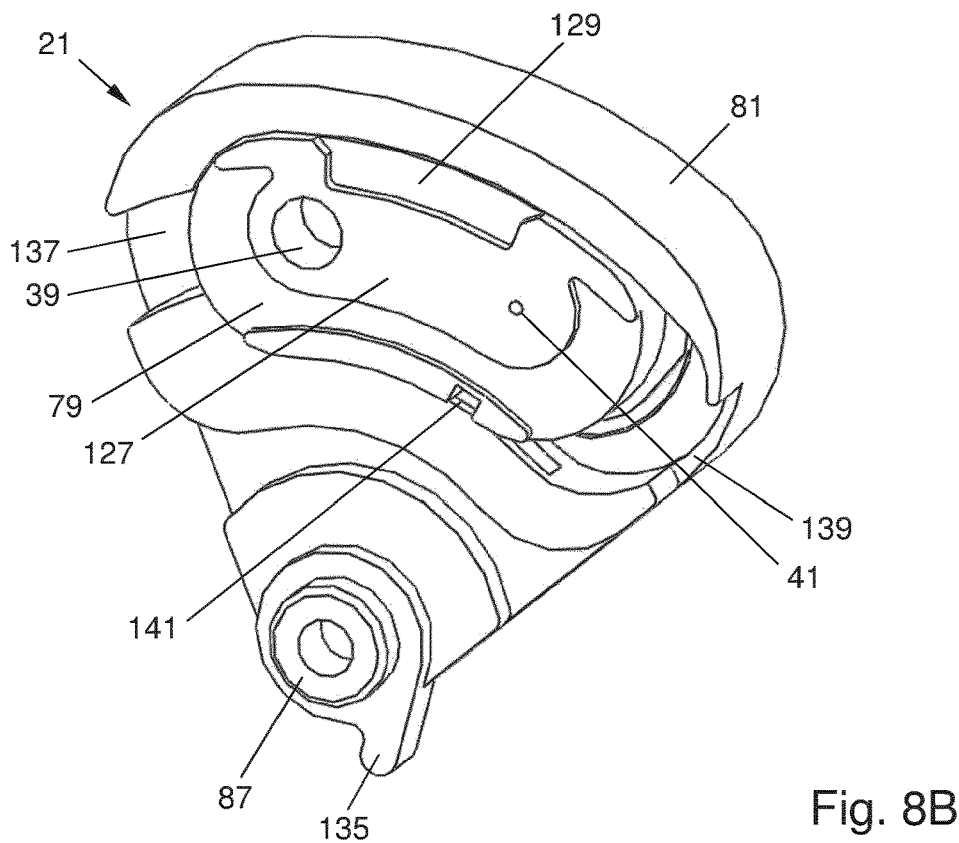

FIGS. 8A and 8B show two end positions of the satellite element 79 in relation to the holder 81 of the selector member 21. In the position illustrated in FIG. 8A the satellite element 79 is in a position in which its small nozzle 41 is aligned with the air needle 121 of the second selector element 85. In FIG. 8B a position is illustrated in which the large nozzle 39 of the satellite element 79 is aligned with the bore 119 of the second selector element 85. Further visible in FIGS. 8A and 8B is a cam 135, which extends from the hub 87. The holder 81 also has well defined opposite first and second cut-outs 137, 139. Further it can be seen in FIGS. 8A and 8B that the satellite element 79 also has a radial recess 141.

The first and second cut-outs 137, 139 allow the holder 81 to rotate beyond first and second end stops 143, 145 shown in FIG. 6. While the first and second end stops 143, 145 of the second valve body part 45B do not interfere with the holder 81, they are each engaged by the satellite element 79. When the satellite element 79 hits one of the end stops it indirectly stops movement of the holder 81, because there is only a predefined limited amount of free relative movement possible with respect to the satellite element 79. This particular aspect of the invention will now be described in reference to FIGS. 9, 10A and 10B.

Figure 9:
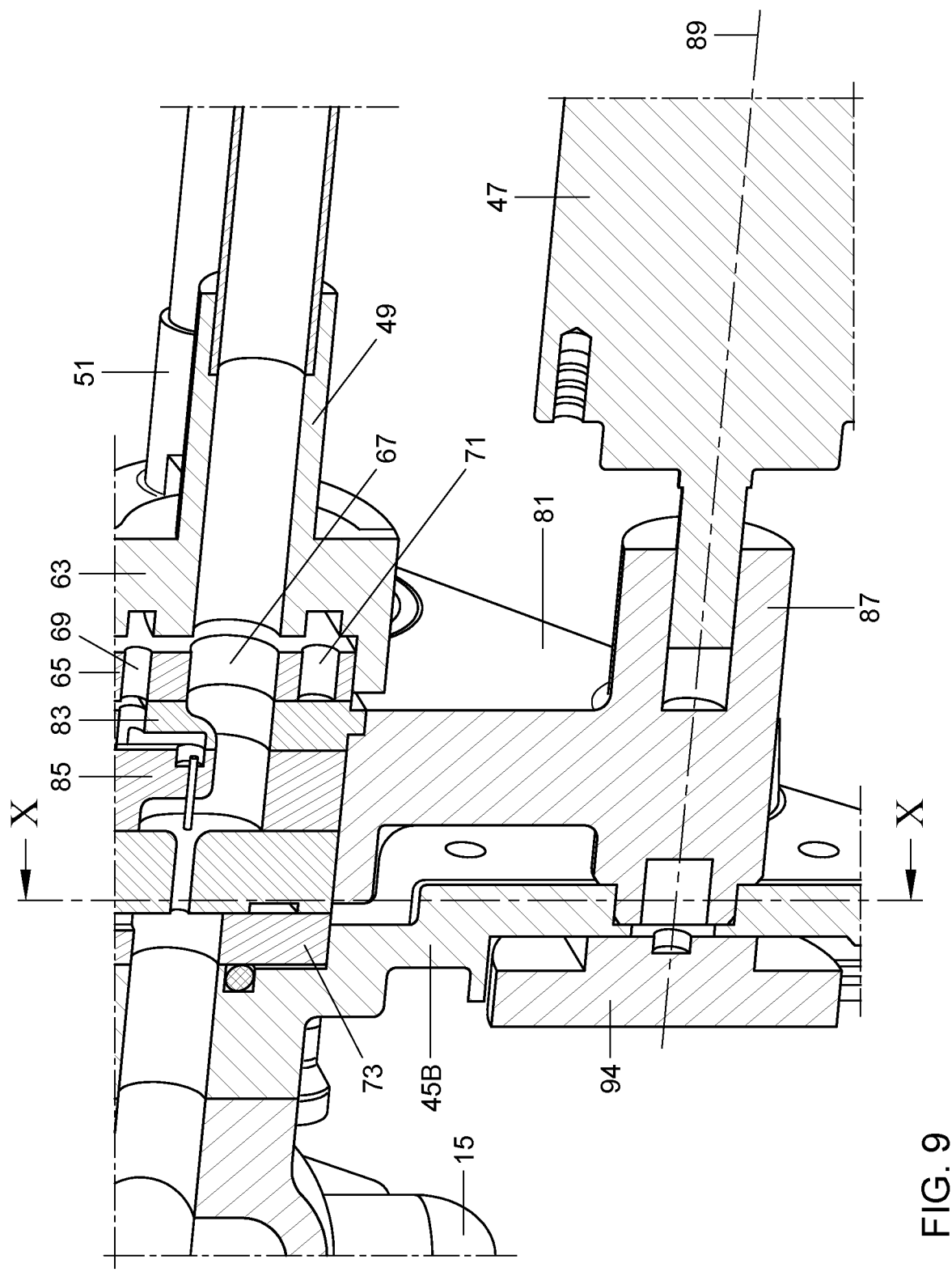
FIG. 9 is a fragmentary longitudinal cross section of the selection valve of FIG. 6 in its assembled state showing the positioning mechanism of the selector member.

FIG. 9 is a fragmentary longitudinal cross section of the selection valve of FIG. 6 in its assembled condition. The reference numeral repeated from the previously described drawing Figures indicate the relative positions of the various elements.

Figure 10A:
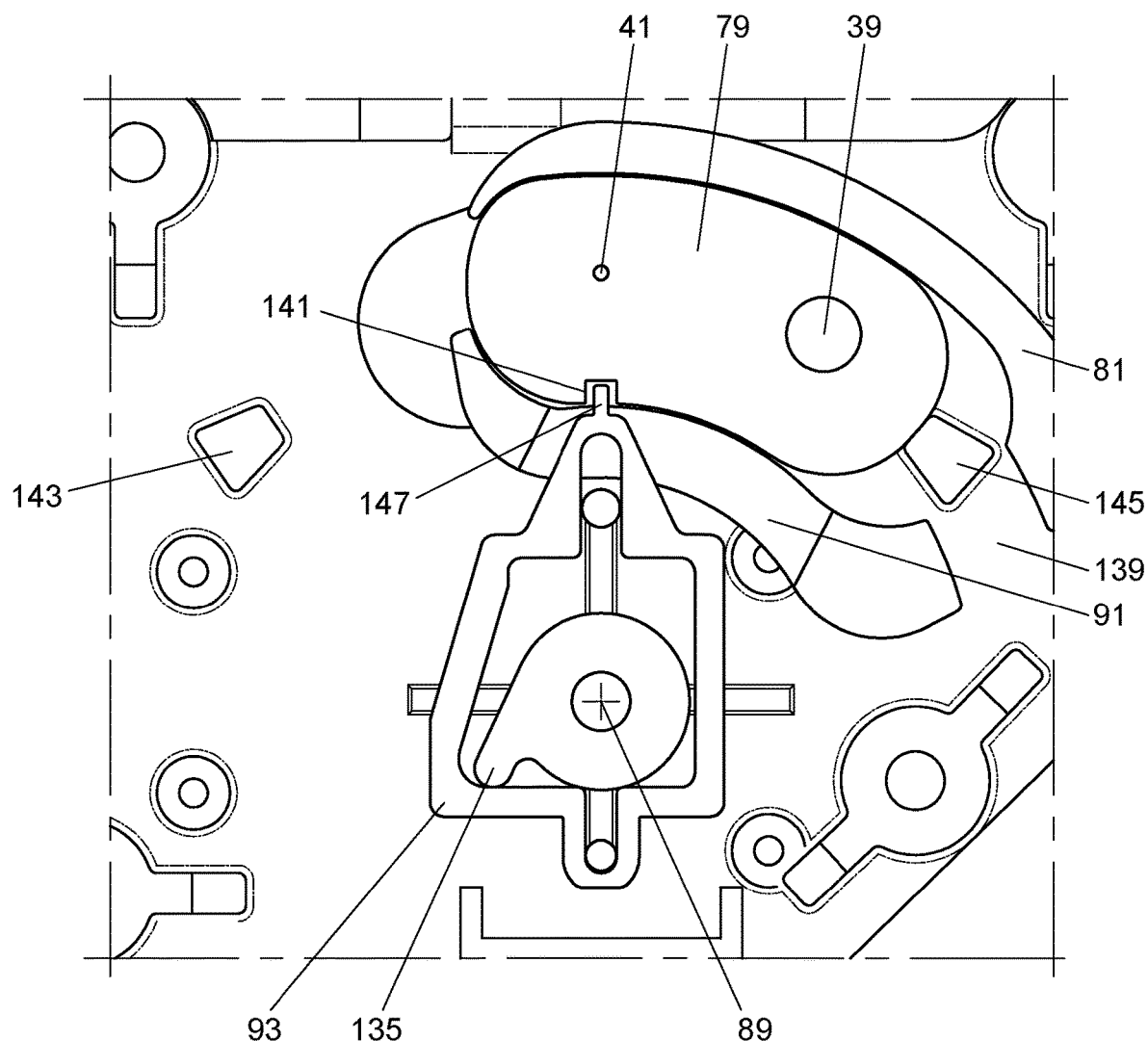
FIGS. 10A and 10B are transverse cross sections of the selection valve taken partially across the holder in accordance with the line X-X indicated in FIG. 9, and showing locking and unlocking positions of the satellite element.
Figure 10B:
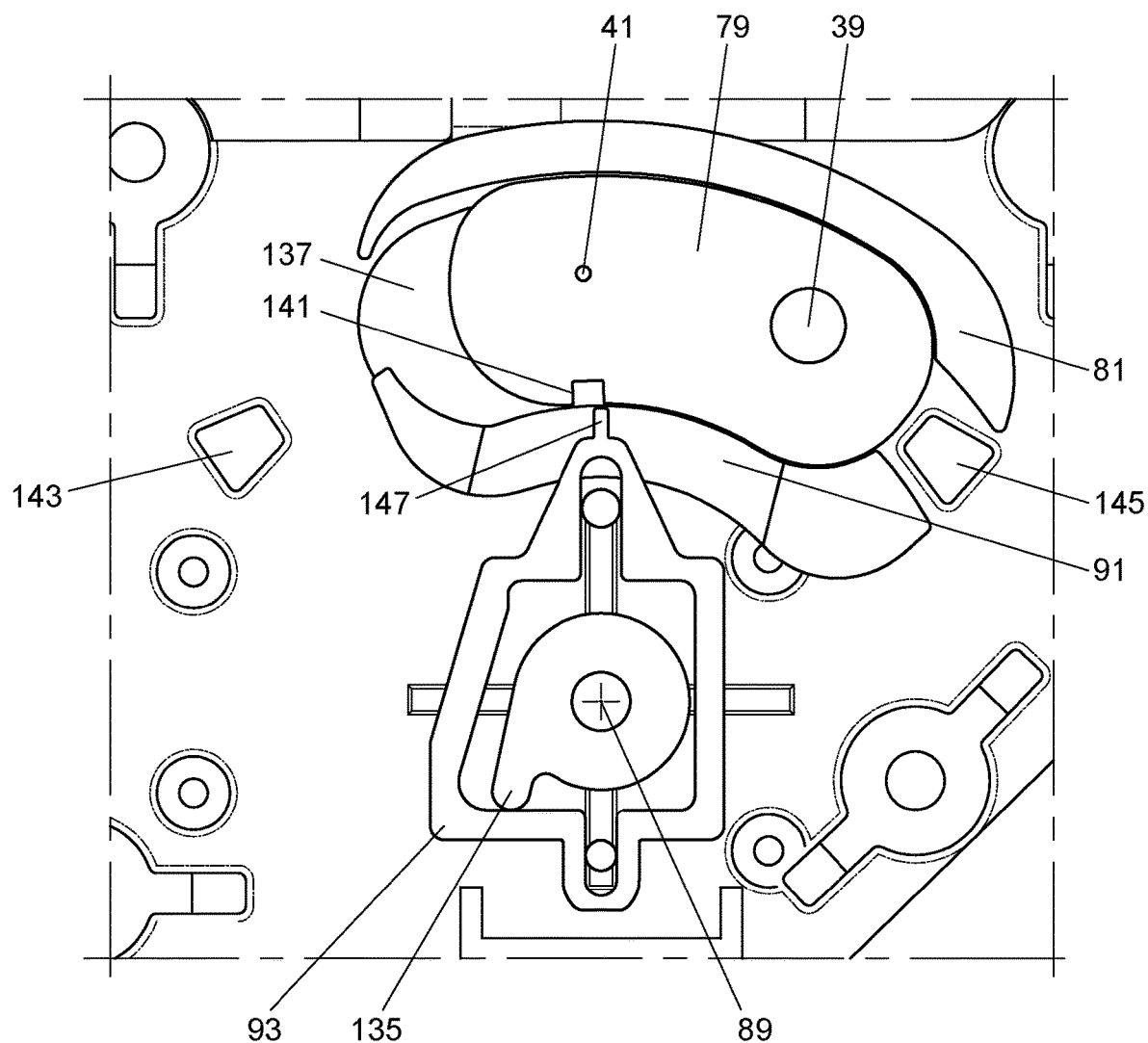

Also indicated in FIG. 9 is a line X-X across which the transverse cross sections of FIGS. 10A and 10B are taken.

FIG. 10A shows a locked position of the satellite element 79 caused by the stop bracket 93 being spring biased in its uppermost position. In the uppermost position of the stop bracket 93 a detent 147 thereof can engage the radial recess 141. The detent 147 is formed on a portion of the stop bracket 93 that extends through the elongate slot 91 in the holder 81. In FIG. 10A it is also shown that the satellite element 79 abuts against the second end stop 145 and that the holder 81 has moved beyond this second end stop 145. Nonetheless in the position shown in FIG. 10A any further movement of the holder 81 beyond the end stop 145 is inhibited by the satellite element 79 also having reached one of its end positions with respect to the holder 81. In this position the small nozzle 41 of the satellite element 79 is aligned with the entrance opening 133 of the mixing chamber (visible in FIG. 6).

In FIG. 10B it is shown that the cam 135 of the holder 81 has moved the detent 147 out of the radial recess 141 by moving the stop bracket 93 against its spring bias. In the position of FIG. 10A the holder 81 is enabled to move the satellite element 79 in a counter clockwise direction for ultimate engagement with the first end stop 143.

The movements thus enabled by the mechanisms described above allow for various positions of the selection valve 11 that will now be illustrated by the FIGS. 11 to 15. FIGS. 11 to 15 are each isometric longitudinal cross sections over the main flow direction of the successive set of valve elements as already depicted in FIGS. 7A and 7B.

Figure 11:
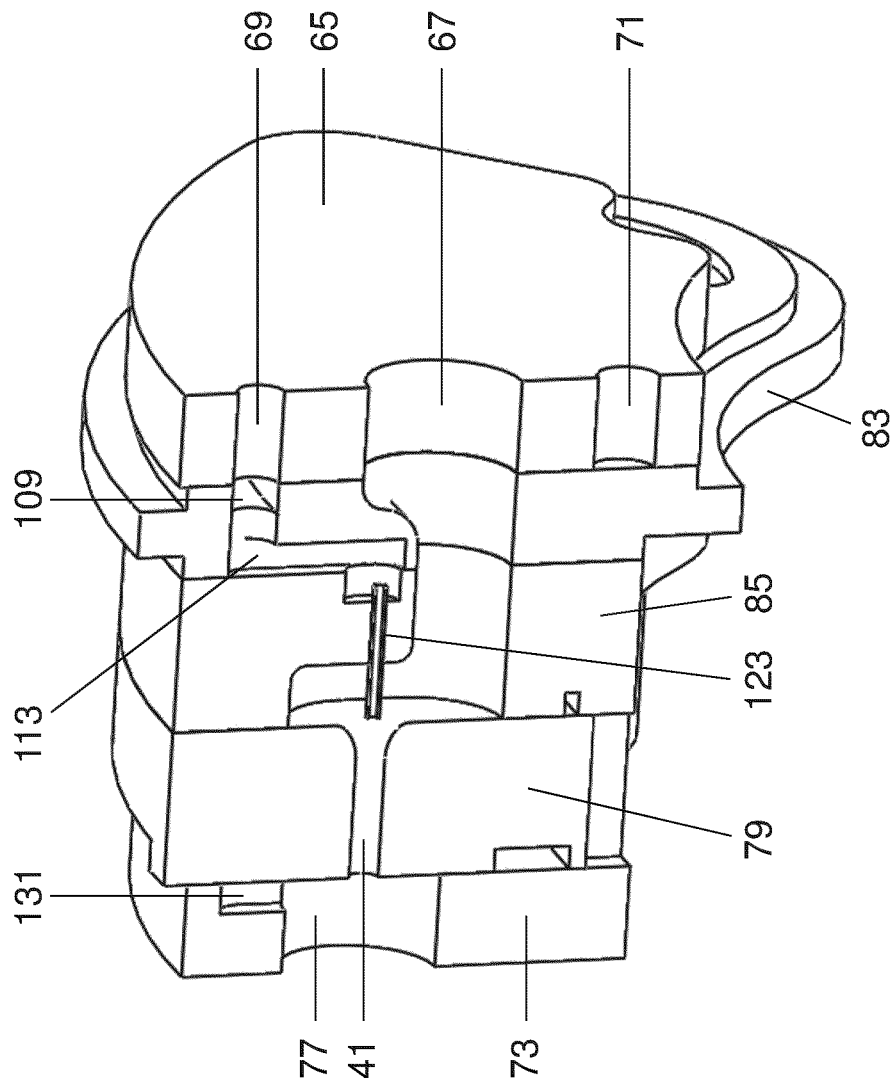
FIG. 11 is a longitudinal cross section of the set of valve elements in a 'Crema' position of the selector valve.

FIG. 11 represents a "Crema" position of the selection valve for generating a hollow jet of water with a core formed by pressurized air. For the "Crema" position the selector member 21 is in one of its opposite end positions with the satellite element 79 abutting the second end stop 145, and the holder 81 of the selector member 21 abutting the satellite element 79. In the "Crema" position both the main aperture 67 and the upper aperture 69 of the first outer valve element 65, respectively allow hot water from the water inlet 49 as well as air from the air inlet 51 to be in fluid communication with the central aperture 77 of the second outer valve element 73. This so-called "Crema" position is intended for producing foamed beverages, such as coffee with a layer of crema. With the valve elements in the 'Crema' position, air is pumped through, water is pumped through a 0.95 mm hole of the needle within the first water opening 123 in the second selector element 85, and the mixing chamber 15 forming a swirl chamber is open. As also seen in FIG. 11 (and in FIG. 9) the needle is supplying air from the upper aperture 69 of the first outer valve element 65. The free open end of the needle in the water opening 123 of the second selector element 85 is ending at or at short distance upstream of the common plane of contact between the second selector element 85 and the satellite element 79. Preferably the open needle end is spaced from the plane of contact between the second selector element 85 and the satellite element 79 between 0 and 2 mm, and more preferably between 0 and 1 mm. Furthermore the needle opening in the "Crema" position is accurately centered with respect to the small nozzle 41 in the satellite element 79, and the nozzle has a diameter of 0.95 mm. The needle in this example has an inner opening diameter of 0.26 mm and an outer diameter of 0.46 mm. With the air flowing from the inner diameter of the needle at a pressure between 0.2-0.3 bar, and the water flowing through the nozzle diameter at between 1.3-1.4 bar a hollow jet is obtained that prevents backflow in the air channel, while creating improved foam quality of the beverage leaving the mixing chamber 15. Relative movement between the ceramic valve elements also continuingly shears off any lime scale particles that could otherwise risk clogging of the small nozzle 41.

Figure 12:
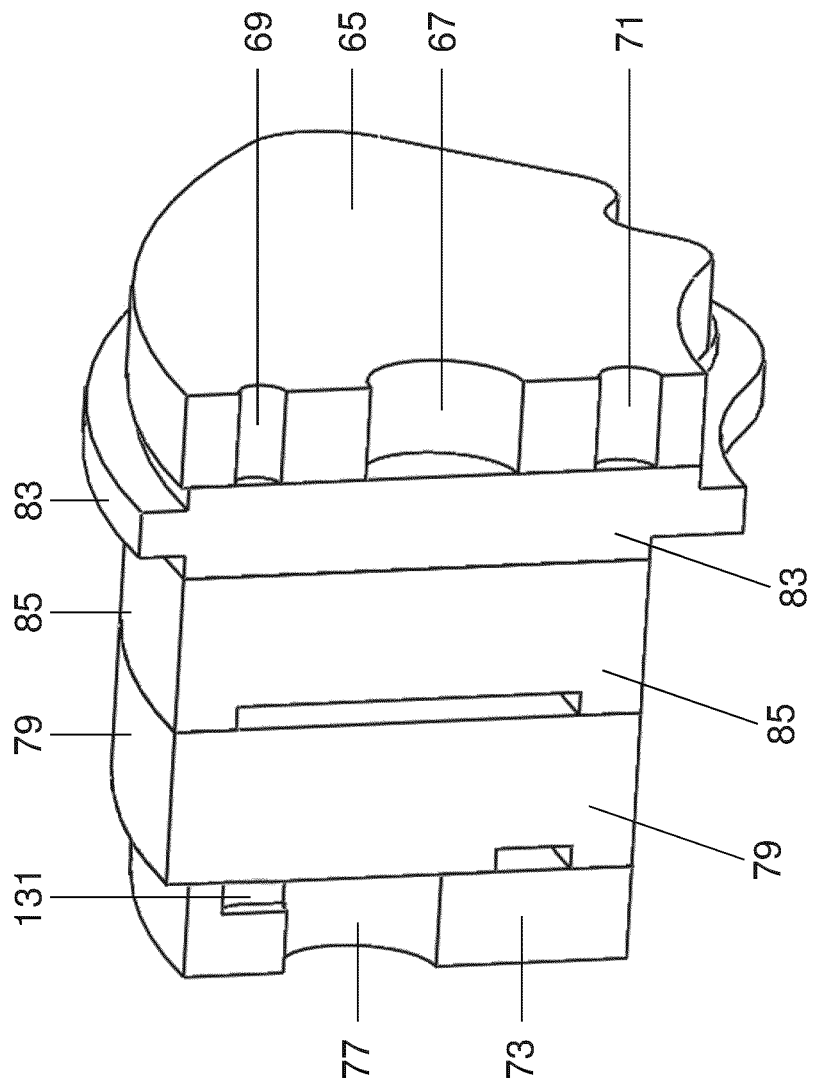
FIG. 12 is a longitudinal cross section of the set of valve elements in a 'Closed' position of the selector valve.

FIG. 12 represents the "Closed" position of the selection valve. In this closed-off position neither the hot water from inlet 49, nor the air from air inlet 51 can flow beyond the main aperture 67 or the upper aperture 69, which are blocked by the first selector element 83. With the valve elements in the 'Closed' position, the air inlet is closed, the water inlet is closed, and the swirl chamber formed by the mixing chamber 15 is closed. The 'Closed' position can be used in cleaning to fill the swirl chamber.

Figure 13:
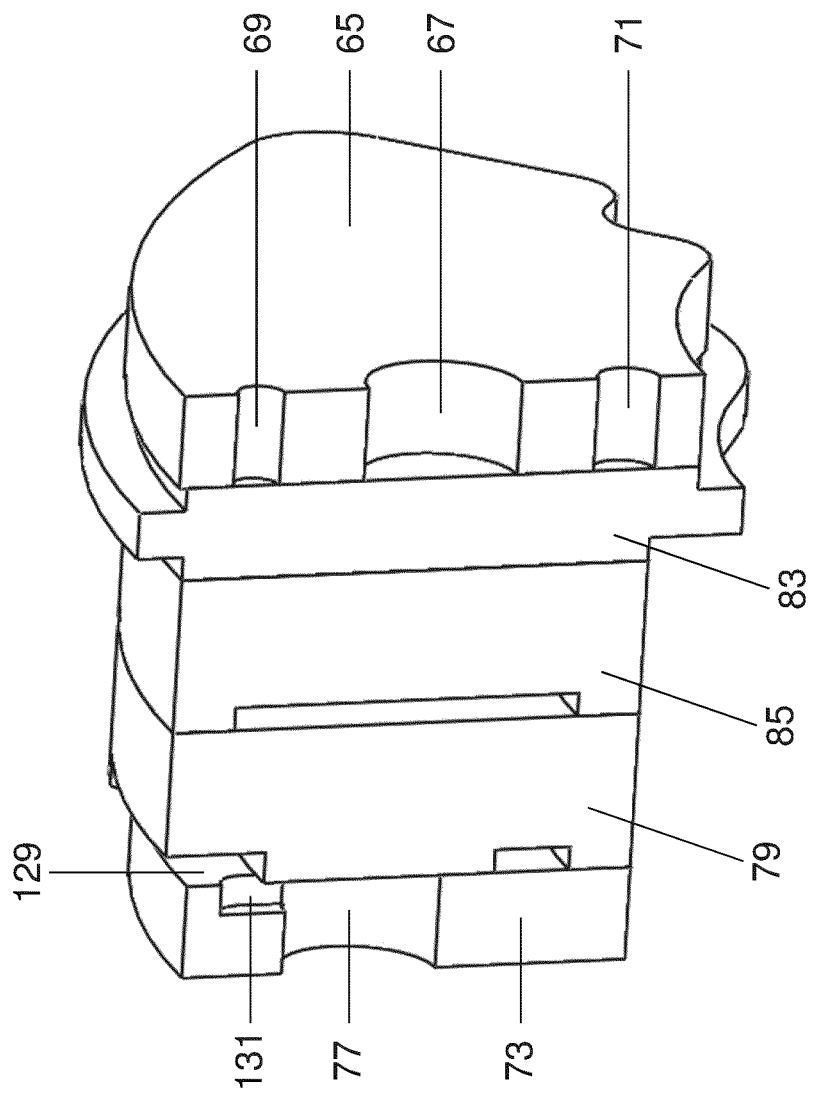
FIG. 13 is a longitudinal cross section of the set of valve elements in a 'Vented' position of the selector valve.

In the position of FIG. 13 the selector valve is also closed off but vented by vent air entering the vent recess 119 and passing through the vent channel 131 in the satellite element 79 into the central aperture 77 of the second outer element 73. In this "Vent" position the mixing chamber can drain itself. With the valve elements in the 'Vented' position, the air inlet is closed, the water inlet is closed, and the swirl chamber is vented. The 'Vented' position can be used to empty dispensing tubes of the beverage outlet 43 at each end of a dispensing cycle.

A benefit of having closed valve options in vented, as well as non-vented variants is that a plurality of valves and mixing chambers can be used in a single beverage system. For example beverage preparation units may be provided for coffee and milk ingredients. In the closed position, water pressure can be maintained at the coffee unit, while the milk unit is in operation, and vice versa.

Figure 14:
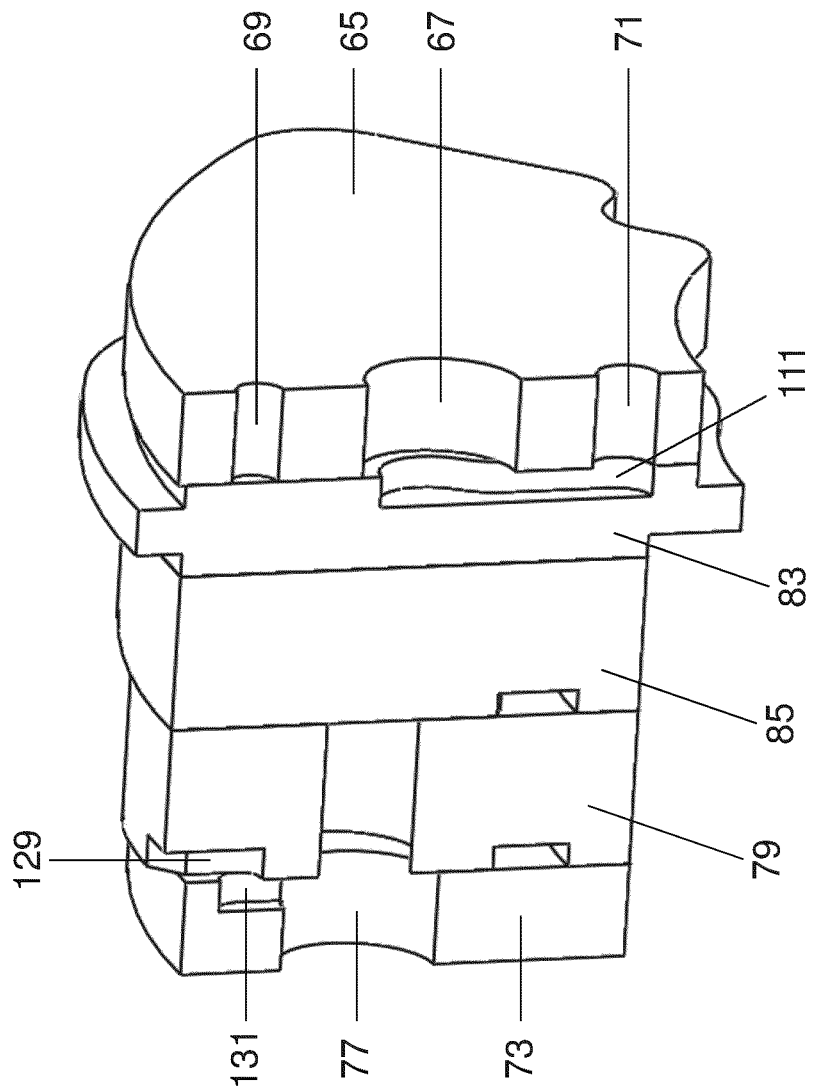
FIG. 14 is a longitudinal cross section of the set of valve elements in a 'By-pass' position of the selector valve.

FIG. 14 illustrates a "By-pass" position of the selection valve, when the selector member 21 is in an intermediate position. In this "By-pass" position the lower aperture 71 of the first outer element 67 is aligned with the recessed by-pass channel 111 of the first selector element 83. This allows hot water from the hot water inlet 49 to pass through the main aperture 67 of the first outer valve element 65 into the by-pass channel 111 of the first selector element 83, and from there through the lower aperture 71 of the first outer element 65 towards the by-pass outlet 53. Venting via the vent recess 129 and the vent channel 131 is also possible in the "By-pass" position of FIG. 14. With the valve elements in the 'By-pass' position, the air inlet is closed, the water inlet is in fluid communication with the water supply tank, and the swirl chamber (mixing chamber 15) is closed. The 'By-pass' position can be used as a default position.

Figure 15:
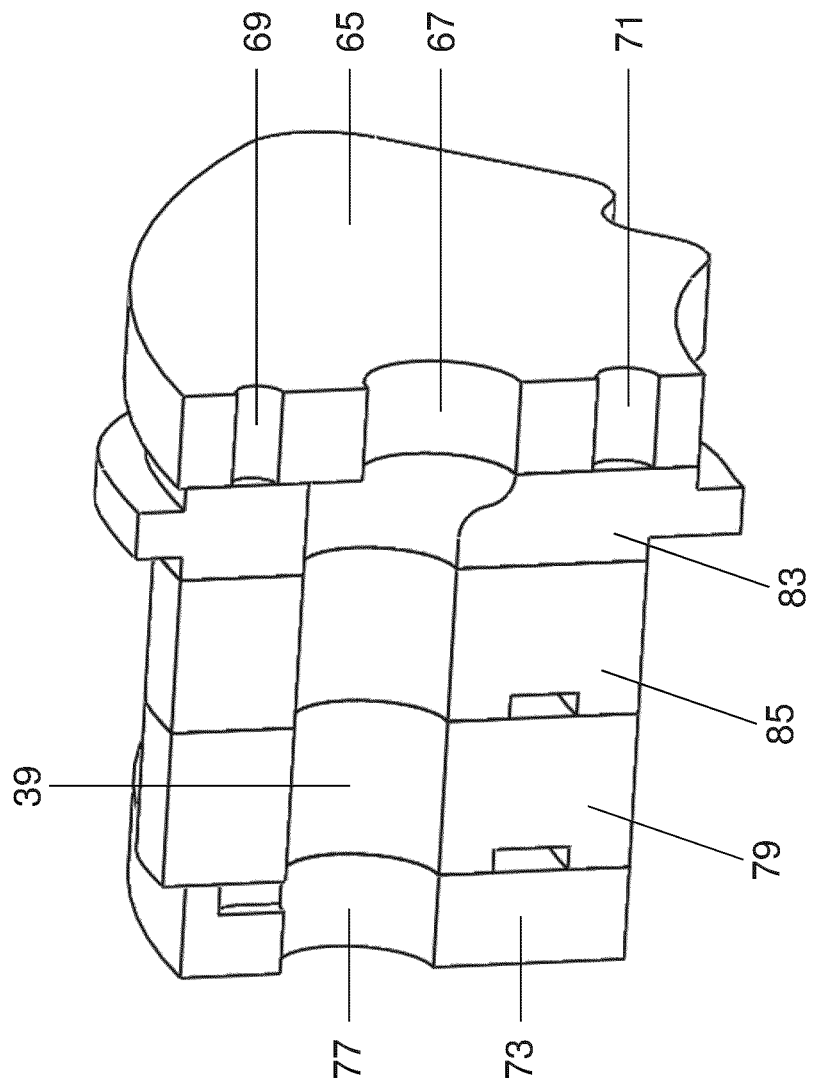
FIG. 15 is a longitudinal cross section of the set of valve elements in a 'Black Coffee' position of the selector valve.

FIG. 15 shows the "Black coffee" position of the selection valve, when the satellite element 79 of the selector member 21 abuts the first end stop 143 and the holder 81 in its turn abuts the satellite element 79. In this position a hot water flow is permitted from the main aperture 67 of the first outer valve element 65 straight to the central aperture 77 of the second outer valve element 73. In this position the air flow is blocked by the upper aperture 69 of the first outer element 65 being closed by the first selector element 83. The flow from the main aperture 67 to the central aperture 77 is through the aligned unrestricted openings of the first selector element 83, the second selector element 85, and the satellite element 79. With the valve elements in the 'Black Coffee' position, the air inlet is closed, the water is pumped through a larger 5 mm hole, and the swirl chamber is closed. The 'Black Coffee' position can be used to obtain foamless drinks, such as in particular black coffee.

Accordingly a selection valve (11), in particular for beverage preparation machines, is described that comprises a valve body (45), a hot water inlet (49) in the valve body, an air inlet (51) in the valve body, and at least a first outlet in the valve body (central aperture 77, and integrated mixing chamber entrance opening 133). In the above described example the mixing chamber is an integrated of the valve body, and hence the mixing chamber entrance opening (133) doubles as the first outlet of the valve body. It will be clear to the skilled person that there can also be a separate connection from the first valve body outlet to a mixing chamber entrance opening. A selector member (21) is movably mounted with respect to the valve body (45) for movement between a first position in which the hot water inlet (49) is in fluid communication with the at least first outlet (77, 133), and a second position in which both the hot water inlet and the air inlet (51) are in fluid communication with the at least first outlet (77, 133). The selection valve (11) further comprises a satellite element (79) associated with the selector member (21). The satellite element (79) is arranged to have a predefined limited amount of free relative movement with respect to the selector member (21) for allowing the satellite element to be positioned independently of the selector member. Relative movement of the satellite element (79), within its predefined limited amount of free relative movement, is between the first and second positions of the selector member (21). Also included are a beverage ingredient mixing unit (33) comprising the selection valve (11), a beverage preparation machine including the selection valve (11), and/or the beverage ingredient mixing unit (33), and a beverage preparation system (1) comprising the beverage preparation machine, and an exchangeable beverage ingredient supply cartridge (3).

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A selection valve, in particular for beverage preparation machines, the selection valve comprising:
   a valve body;
   a hot water inlet in the valve body;
   an air inlet in the valve body;
   at least a first outlet in the valve body;
   a selector member movably mounted with respect to the valve body for movement between a first position in which the hot water inlet is in fluid communication with the at least first outlet, and a second position in which both the hot water inlet and the air inlet are in fluid communication with the at least first outlet, wherein the selector member includes a holder having a first selector element unmovably mounted;
   a satellite element associated with the selector member and being a further movable valve element, wherein the satellite element has a predefined limited amount of free relative movement with respect to the selector member for allowing the satellite element to be positioned independently of the selector member in between the first and second positions thereof, within the predefined limited amount of free relative movement.

2. The selection valve according to claim 1, wherein the second position of the selector member allows pressurized water and pressurized air to exit the at least first outlet as a hollow jet having an outer liquid portion extending in a flow direction of the jet and an inner air portion extending in the flow direction of the jet, wherein the outer liquid portion surrounds the inner air portion.

3. The selection valve according to claim 1, wherein a second outlet is provided in the valve body that is configured as a by-pass for hot water entering the hot water inlet.

4. The selection valve according claim 1, further comprising a first outer valve element stationary held by the valve body adjacent to the hot water inlet.

5. The selection valve according to claim 4, wherein the first outer valve element includes a main aperture.

6. The selection valve according to claim 4, wherein the first outer valve element is a ceramic valve element.

7. The selection valve according to claim 1, further comprising a second outer valve element stationary held by the valve body adjacent to the at least first outlet.

8. The selection valve according to claim 1, wherein the selector member is arranged for sliding movement with respect to the valve body.

9. The selection valve according to claim 1, wherein the satellite element is arranged to be engaged for movement by the holder.

10. A beverage ingredient mixing unit comprising the selection valve of claim 1 in fluid communication with a mixing chamber.

11. The beverage ingredient mixing unit according to claim 10, further comprising a wherein the mixing chamber is in fluid communication with a beverage ingredient entrance inlet.

12. A beverage preparation machine comprising the beverage ingredient mixing unit of claim 10.

13. The beverage preparation machine according to claim 12, further comprising an air pump in fluid communication with the air inlet in the valve body.

14. The beverage preparation machine according to claim 12, further comprising a boiler in fluid communication with the hot water inlet in the valve body.

15. A beverage preparation system comprising the beverage preparation machine of claim 12, further comprising an exchangeable beverage ingredient supply cartridge.

16. The beverage preparation system according to claim 15, wherein the ingredient supply cartridge has a fluid outlet port and a drive port adjacent to the fluid outlet port.

17. The beverage preparation system according to claim 15, wherein the ingredient supply cartridge includes a doser.

18. The beverage preparation system according to claim 17, wherein the mixing chamber of the beverage ingredient mixing unit is in fluid communication with a beverage ingredient inlet and the beverage ingredient mixing unit includes a protruding drive shaft, and wherein the ingredient supply cartridge has a fluid outlet port and a drive port adjacent to the fluid outlet port, wherein the fluid outlet port connects to the ingredient inlet of the mixing chamber, and wherein the drive port connects to the protruding drive shaft for enabling activation of the doser in dosing beverage ingredient to the mixing chamber.

19. The selection valve of claim 1, wherein the satellite element has a first nozzle and a second nozzle, the first nozzle being in fluid communication between the hot water inlet and the at least first outlet when the selector member is in the first position, and the second nozzle being in fluid communication between both the hot water inlet and the air inlet and the at least first outlet when the selector member is in the second position.

20. The selection valve of claim 19, wherein the first nozzle is larger than the second nozzle.

* * * * *